(12) United States Patent
Dowlatkhah

(10) Patent No.: US 9,788,260 B2
(45) Date of Patent: Oct. 10, 2017

(54) METHODS AND APPARATUS TO NETWORK UNMANNED AERIAL VEHICLES (UAVS)

(71) Applicant: AT&T Intellectual Property I, LP, Atlanta, GA (US)

(72) Inventor: Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/044,917

(22) Filed: Feb. 16, 2016

(65) Prior Publication Data
US 2017/0238234 A1 Aug. 17, 2017

(51) Int. Cl.
| | | |
|---|---|---|
| H04Q 7/20 | (2006.01) | |
| H04W 40/28 | (2009.01) | |
| H04W 48/16 | (2009.01) | |
| H04W 48/20 | (2009.01) | |
| H04W 40/24 | (2009.01) | |
| B64C 39/02 | (2006.01) | |
| G07C 5/08 | (2006.01) | |
| G07C 5/00 | (2006.01) | |

(52) U.S. Cl.
CPC .......... *H04W 40/28* (2013.01); *B64C 39/024* (2013.01); *G07C 5/008* (2013.01); *G07C 5/0816* (2013.01); *H04W 40/244* (2013.01); *H04W 48/16* (2013.01); *H04W 48/20* (2013.01); *B64C 2201/122* (2013.01)

(58) Field of Classification Search
CPC ... H04W 40/28; H04W 40/244; H04W 48/16; H04W 48/20; B64C 39/024; B64C 2201/122
See application file for complete search history.

(56) References Cited

U.S. PATENT DOCUMENTS 9,022,324 B1 5/2015 Abhyanker
9,043,052 B2 5/2015 So et al.
(Continued)

FOREIGN PATENT DOCUMENTS

WO 2015139733 9/2015

OTHER PUBLICATIONS

Andre et al., "Application-Driven Design of Aerial Communication Networks," IEEE Communications Magazine, May 2014 (9 pages).
(Continued)

*Primary Examiner* — Nguyen Vo
(74) *Attorney, Agent, or Firm* — Haynes and Boone, LLP

(57) ABSTRACT

Methods, apparatus, systems and articles of manufacture are disclosed to network unmanned aerial vehicles (UAVs). An example method includes establishing, with a processor, a discoverable network node in a first unmanned aerial vehicle in response to deployment in a geographic region of interest, joining, with the processor, a second unmanned aerial vehicle to the communication network in response to a connection request, acquiring, with the processor, payload data with a sensor of the first unmanned aerial vehicle from the geographic region of interest, identifying, with the processor, a profile type of the payload data, and transmitting, with the processor, a first portion of the payload data to the second unmanned aerial vehicle when the profile type of the payload data has a first profile type.

21 Claims, 13 Drawing Sheets

(56) References Cited

U.S. PATENT DOCUMENTS

| | | | |
|---|---|---|---|
| 9,051,043 B1 | 6/2015 | Peeters et al. | |
| 9,056,676 B1* | 6/2015 | Wang | B64F 1/00 |
| 9,075,415 B2 | 7/2015 | Kugelmass | |
| 9,524,648 B1* | 12/2016 | Gopalakrishnan | G08G 5/0082 |
| 2004/0193878 A1* | 9/2004 | Dillinger | H04L 63/18 |
| | | | 713/165 |
| 2014/0172194 A1 | 6/2014 | Levien et al. | |
| 2014/0316616 A1* | 10/2014 | Kugelmass | G05D 1/101 |
| | | | 701/8 |
| 2015/0236778 A1 | 8/2015 | Jalali | |
| 2015/0304869 A1 | 10/2015 | Johnson et al. | |
| 2015/0327136 A1 | 11/2015 | Kim et al. | |
| 2015/0336668 A1 | 11/2015 | Pasko et al. | |
| 2015/0351084 A1* | 12/2015 | Werb | H04W 12/08 |
| | | | 370/329 |
| 2016/0003954 A1 | 1/2016 | Broussard, III et al. | |
| 2016/0137311 A1* | 5/2016 | Peverill | B64C 39/024 |
| | | | 244/110 C |
| 2016/0155339 A1* | 6/2016 | Saad | G05D 1/0295 |
| | | | 701/25 |

OTHER PUBLICATIONS

Department 13, "Department 13—Innovation in Counter Drone Defense Program Communication and Networking Technology," Presentation, Nov. 2015 (39 pages).

Park et al., "Optimal Coverage Control for Net-Drone Handover," IEEE, 2015 Seventh International Conference on Ubiquitous and Future Networks (ICUFN), Jul. 2015 (3 pages).

* cited by examiner

400

| Deployment Parameter | Parameter Value |
|---|---|
| DEPLOYMENT PROFILE 400 | |
| 402 | 404 |
| 406 → * Video resolution at deployment | * 640x480 |
| 408 → * Video resolution at ROI | * 1920x1080 |
| 420 → * Payload behavior at low res. (640x480) | * Store in on-board memory |
| 422 → * Payload behavior at high res. (1920x1080) | * Perform peer-UAV transfer |
| 410 → * Comm. protocol with Command Center at ROI | * LTE |
| 412 → * Peer-UAV comm. protocol at ROI | * 802.xx |
| 414 → * Peer-UAV comm. protocol if threat | * LTE |
| 416 → * Crash indication directive | * Delete all payload data |
| 424 → * Unsuccessful transfer directive | * Delete all payload data |
| 418 → * Action after peer-UAV transfer | * Delete transferred data and transfer remaining to command ctr. |
| * .... | |
| * .... | |

FIG. 4

METHODS AND APPARATUS TO NETWORK UNMANNED AERIAL VEHICLES (UAVS)

FIELD OF THE DISCLOSURE

This disclosure relates generally to establishing and maintaining unmanned aerial vehicle (UAV) communications, and, more particularly, to network UAVs.

BACKGROUND

In recent years, use of unmanned aerial vehicles (UAVs) have been applied for search-and-rescue missions, scientific research, mapping projects, and more. The UAVs may include payload equipment for the purpose of acquiring data related to deployment objectives, in which respective payload data is to be retrieved and/or otherwise received by mission control center(s) (e.g., a ground command center). The payload data may contain images (e.g., high resolution photos, multi-spectral images, thermal images, etc.), video (e.g., live-action, infrared video, etc.), and/or sensor data (e.g., barometric pressure, temperature, magnetic/electric field data, radar, etc.). In some examples, data retrieved and/or otherwise received by the UAVs may allow strategic planning before sending appropriate personnel and/or equipment to one or more points of interest.

BRIEF DESCRIPTION OF THE DRAWINGS

FIG. 4 is an example deployment profile used by the example payload manager to network UAVs in the example environment of FIG. 1.

DETAILED DESCRIPTION

Figure 1:
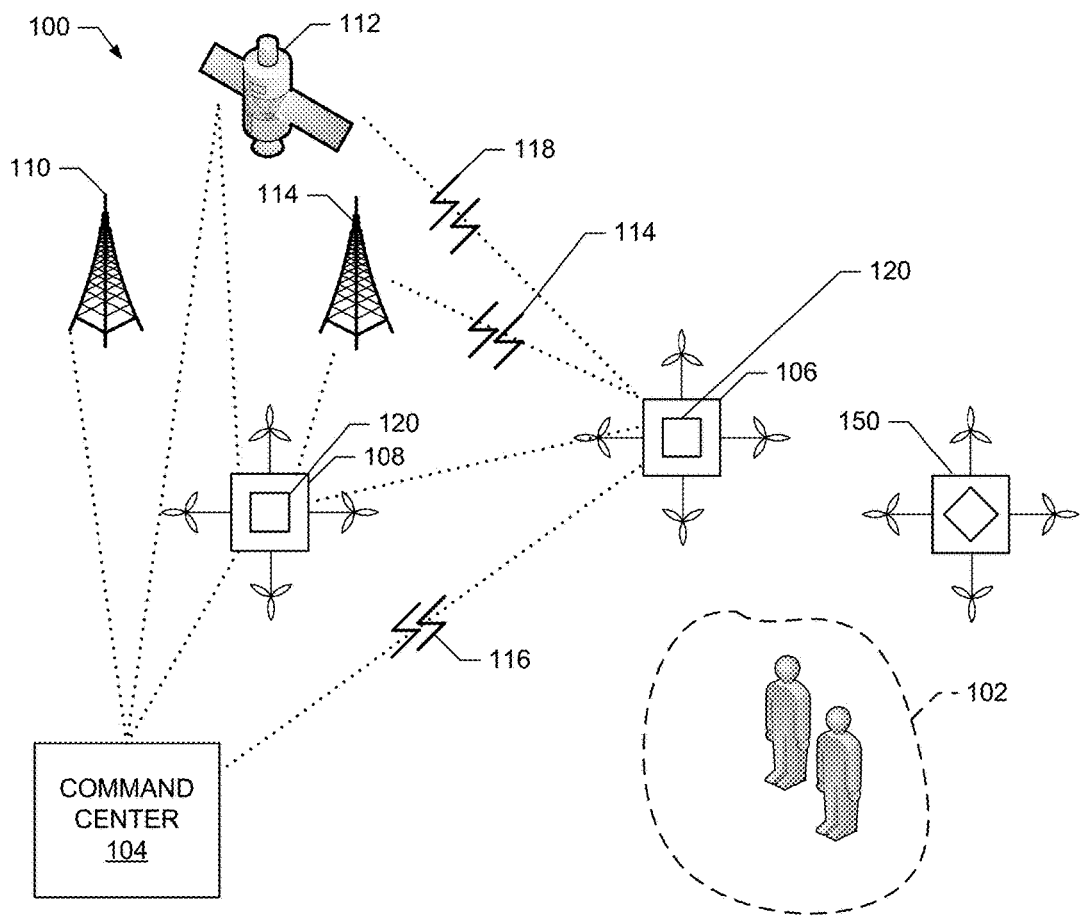
FIG. 1 is a schematic illustration of an example unmanned aerial vehicle (UAV) mission environment to facilitate networking between two or more UAVs.

Example methods disclosed herein include establishing a communication network for unmanned aerial vehicles by establishing a discoverable network node in a first unmanned aerial vehicle in response to deployment in a geographic region of interest, joining a second unmanned aerial vehicle to the communication network in response to a connection request, acquiring payload data with a sensor of the first unmanned aerial vehicle from the geographic region of interest, identifying a profile type of the payload data, and transmitting a first portion of the payload data to the second unmanned aerial vehicle when the profile type of the payload data has a first profile type.

Example apparatus to establish a communication network for unmanned aerial vehicles disclosed herein include a discovery engine to establish a discoverable network node in a first unmanned aerial vehicle in response to a deployment in a geographic region of interest, and join a second unmanned aerial vehicle to the communication network in response to a connection request. Example apparatus also include a payload equipment interface to acquire payload data with a sensor of the first unmanned aerial vehicle from the geographic region of interest, a payload data type identifier to identify a profile type of the payload data, and a data transfer engine to transmit a first portion of the payload data to the second unmanned aerial vehicle when the profile type of the payload data has a first profile type.

An example tangible article of manufacture comprising instructions is disclosed herein. The example instructions, when executed, perform operations including establishing a discoverable network node in a first unmanned aerial vehicle in response to deployment in a geographic region of interest, joining a second unmanned aerial vehicle to the communication network in response to a connection request, acquiring payload data with a sensor of the first unmanned aerial vehicle from the geographic region of interest, identifying a profile type of the payload data, and transmitting a first portion of the payload data to the second unmanned aerial vehicle when the profile type of the payload data has a first profile type.

While payload data generated and/or otherwise acquired by payload equipment on-board unmanned aerial vehicles (UAVs) (sometimes referred to as "drones") may be useful to accomplish certain mission objectives, such payload data is vulnerable to several threats. Threats may include communication reliability due to distance limitations between the UAVs and a command center, or due to environmental interference. Threats may also be associated with data sensitivity and/or privacy concerns, such as UAV data acquisition missions related to law enforcement missions, or military missions involving secretive information. In some examples, data acquired by UAVs is the target of malicious activity that attempts to intercept and/or otherwise destroy the acquired data. Additional challenges associated with using UAVs to acquire data relates to limited storage capabilities of the UAVs, which can reduce mission flight duration when data storage capacity becomes fully consumed. Further, in the event a UAV crashes in a remote area, data already acquired by the fallen UAV may be susceptible to discovery and/or disclosure to unwanted parties that obtain the fallen UAV.

Traditional ways of collecting acquired data from UAVs include physically retrieving the UAV after the mission objectives are complete and physically downloading such acquired data from on-board storage (e.g., hard disks, solid-state drives, flash memory, etc.). However, in the event the UAV experiences a flight error, collision or crash, then the acquired data may be lost and/or retrieved by (malicious) third parties. In other traditional examples, the UAV transmits the acquired data as a file via one or more wireless connections (e.g., cell-based protocols (e.g., LTE), 802.x protocols, radios, etc.). However, in the event of intermittent, noisy or poor radio-based connections between the UAV and the control center, data corruption and/or data loss may occur.

Example methods, apparatus, systems and articles of manufacture disclosed herein retrieve UAV payload information in a manner that improves efficiency and security.

FIG. 1 illustrates an example UAV mission environment 100 that includes a geographic region of interest (ROI) 102 to be studied, searched, scanned and/or otherwise evaluated by one or more UAVs. In the illustrated example of FIG. 1, a command center 104 deploys a first UAV 106 and a second UAV 108 to the geographic ROI 102 so that mission objectives can be completed. While the illustrated example of FIG. 1 includes two (2) deployed UAVs (i.e., the first UAV 106 and the second UAV 108), examples disclosed herein are not limited thereto. Mission objectives performed by the one or more UAVs may include, but are not limited to search-and-rescue missions, electrical power equipment inspection missions, law enforcement missions, military missions, entertainment/filming missions, crash site inspection missions, etc.

The example command center 104 is communicatively connected to the example first UAV 106 and the example second UAV 108 when initially deployed. However, as one or more of the UAVs travels away from the example command center 104, direct (e.g., radio-based) communication techniques may have inherent limitations that prevent communication with the one or more UAVs. To allow the example command center 104 a greater ability to maintain communication with one or more deployed UAVs (e.g., the example first UAV 106, the example second UAV 108, etc.), the command center 104 is communicatively connected to one or more cell-based communication networks and/or satellite-based communication networks. In the illustrated example of FIG. 1, the command center 104 is communicatively connected to a first base station 110 and/or one or more satellites 112. The example first base station 110 may further be communicatively connected to a second base station 114, which may further enable control and/or data acquisition capabilities of the one or more deployed UAVs.

In some examples, a UAV that has travelled away from the example command center 104 may not be able to maintain communication capabilities with the command center 104. Even when the one or more UAVs include multiple different communication capabilities (e.g., cell-based, 802.11x, satellite, etc.), several reasons may cause the lack of communication capabilities therebetween. Example reasons for a lack of communication capabilities include, but are not limited to communication technology distance limitations, insufficient cell coverage, electrical noise interference, weather conditions, malicious jamming activity, etc. In the illustrated example of FIG. 1, the first UAV 106 has reached the example geographic ROI 102, but no longer has the ability to communicate with the command center 104 (see communication failure indicator 114 for cell-based communication techniques, see communication failure indicator 116 for direct radio-based communication techniques, see communication failure indicator 118 for satellite-based communication techniques).

Example methods, apparatus, systems and articles of manufacture disclosed herein improve the security and reliability of UAV communication by, in part, establishing a dynamic communication cloud. In some examples, deployed UAVs invoke a peer-UAV discovery command to identify one or more additional UAVs that have also been deployed for a particular mission (e.g., a search-and-rescue). In the event a peer-UAV is identified, both UAVs establish an ad-hoc communication network therebetween. As one or more additional peer-UAVs are identified, they too are added to the ad-hoc communication network. As a result, in the event one or more of the UAVs cannot directly communicate with the example command center 104, then payload data, control commands and/or telemetry information can be relayed to one or more of the peer UAVs within the ad-hoc communication network. Data that has been relayed from one UAV to a peer-UAV may be further transmitted to the command center 104, particularly in instances where the peer-UAV is relatively closer to the command center 104. However, in the event a first peer-UAV is still unable to transmit data to the example command center 104, then additional peer-UAVs may receive and/or otherwise retrieve (sometimes referred herein as "UAV hops") payload data for continued attempts to deliver the payload data to the command center 104. Any number of UAV hops may be employed in an effort to ultimately provide the payload data to the example command center 104.

In some examples, a UAV may experience flight errors and/or communication errors indicative of risk to acquired payload data. Flight errors may include mechanical and/or electro-mechanical irregularities detected by on-board flight controllers. Flight errors may also include collision instances with objects and/or weather conditions that prohibit execution of a mission. Communication errors may include communication signal strength degradation and/or intermittent communication reliability. In the event flight errors and/or communication errors are detected by the UAV, then payload data preservation actions may be invoked by the UAV to offload collected payload data to a safe target, such as one or more peer-UAVs. The payload data preservation actions may seek one or more peer-UAVs in an effort to begin payload data transmission before the flight and/or communication error advances further.

In the event a flight error results in a crash of the UAV, the example payload data preservation actions may continue to seek one or more peer-UAVs for data offload. However, in the event efforts to transmit the payload data to the one or more peer-UAVs fails, then the payload data preservation actions may include data encryption actions or payload data deletion actions, both of which reduce chances of unwanted third parties from obtaining the collected payload data from the disabled UAV. In still other examples, after the disabled UAV completes payload data transfer actions to the one or more peer-UAVs, the disabled UAV may delete the on-board payload data to prevent unwanted disclosure of that data.

In some examples, one or more deployed UAVs detects the presence of a foreign UAV 150 in the vicinity of the geographic ROI 102. In such instances, the payload data preservation actions may include switching a communication protocol used by the ad-hoc network of UAVs to reduce the possibility of the foreign UAV 150 from obtaining payload data. For example, the ad-hoc network of UAVs may initially utilize an 802.11x protocol to transfer data and/or commands therebetween. In view of particular security vulnerabilities associated with the 802.11x protocol(s), the example payload data preservation actions may switch to a relatively more secure communication protocol, such as a cell-based Long-Term Evolution (LTE) protocol. Additionally, in response to detecting a threat, such as a foreign UAV 150, the example payload data preservation actions may instruct one or more UAVs to abort the mission and/or return to the example command center 104 or return to another destination to avoid further exposure to the threat.

In the illustrated example of FIG. 1, each of the deployed UAVs (e.g., the first UAV 106, the second UAV 108) includes a UAV controller 120. For ease of illustration, the example UAV controller 120 is shown in the illustrated example of FIG. 1 as an exploded view (see dashed border 120). The example UAV controller 120 includes an example flight system 122, example payload equipment 124, example communication equipment 126, an example payload manager 128, and an example payload data storage 130. The example flight system 122 includes equipment, components and controllers to manage UAV flight operations and may include inertial sensors, accelerometers, gyroscopes, object detection systems, radar, altimeters, motor controllers, flap/aileron controllers, rudder controllers, and/or flight path script information. The example communication equipment 126 includes equipment, components and controllers to facilitate communication with the example command center 104 and/or one or more peer-UAVs and may include global positioning satellite (GPS) transceivers, wireless radios (e.g., 802.11x, Bluetooth®, LTE, etc.), communication port(s) (e.g., Firewire® ports, Universal Serial Bus (USB) ports, network cable ports, etc.), and/or radio spectrum sensors capable of detecting proximate communication technologies, which may alert the UAV of third party proximity and/or presence. The example payload equipment 124 includes sensors and equipment capable of meeting mission objectives. In some examples the payload equipment 124 includes still image cameras, video cameras, thermal imaging cameras, environmental sensors, etc.

Figure 2:
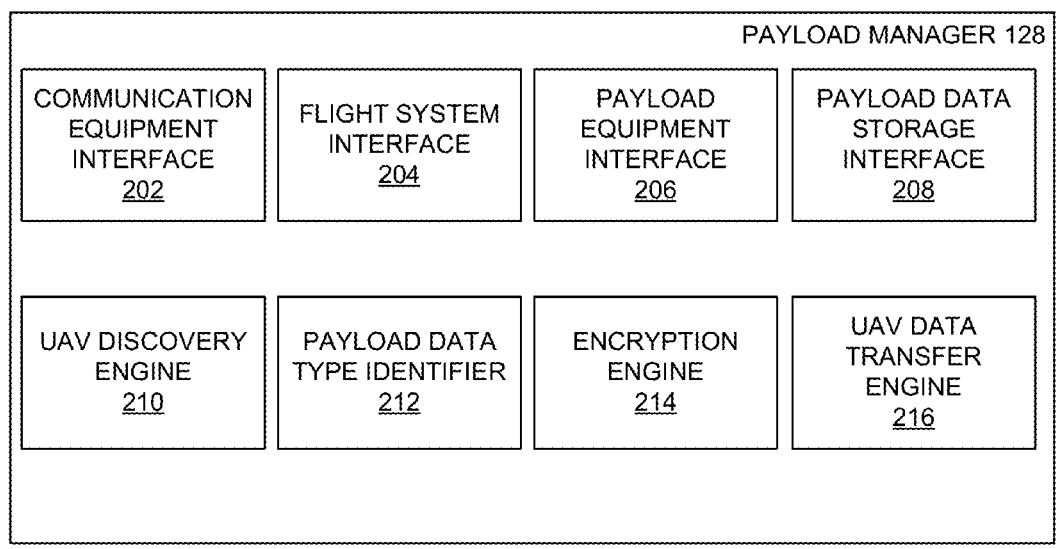
FIG. 2 is a schematic illustration of an example payload manager to network UAVs in the example environment of FIG. 1.

FIG. 2 includes additional detail of the example payload manager 128 of FIG. 1. In the illustrated example of FIG. 2, the payload manager 128 includes an example communication equipment interface 202, an example flight system interface 204, an example payload equipment interface 206, an example payload data storage interface 208, an example UAV discovery engine 210, an example payload data type identifier 212, an example encryption engine 214, and an example UAV data transfer engine 216. In operation, the example command center 104 deploys one or more UAVs, such as the example first UAV 106 and the example second UAV 108, to the geographic ROI 102. As each additional UAV is deployed, the example UAV discovery engine 210 establishes a discoverable network node so that peer-UAVs can establish a dynamic network cloud (ad-hoc network). The example payload equipment interface 206 activates payload data acquisition equipment required for a desired mission objective(s). As described above, the payload data acquisition equipment may be of any type, such as still/video cameras, thermal imaging cameras, and/or other sensors. During the mission flight, the example payload equipment interface facilitates payload data acquisition, which is initially stored to the example payload data storage 130.

In some examples, payload data is stored in differing manners depending on a data type, a data resolution and/or operational conditions. For example, video data may be collected while the UAV is en-route to the geographic ROI at a first resolution and, once the UAV arrives at the target destination, video data may be collected at a relatively higher second resolution. While the relatively lower resolution data may have a particular value to a search-and-rescue team to evaluate the ease or difficulty in reaching the geographic ROI, the relatively higher resolution data acquired at the ROI is beneficial for rescue personnel when determining a severity of their rescue effort. In an effort to transmit acquired data without inundating communication capabilities of any one UAV, examples disclosed herein divide the payload data into two or more portions for transmission to peer-UAVs. The example payload data type identifier 212 determines a particular data type (e.g., high resolution, low resolution, a codec type, top secret, etc.) and, if the data type matches a data transfer profile rule, the example UAV data transfer engine 216 determines data portions for multi-UAV distribution.

Figure 3:
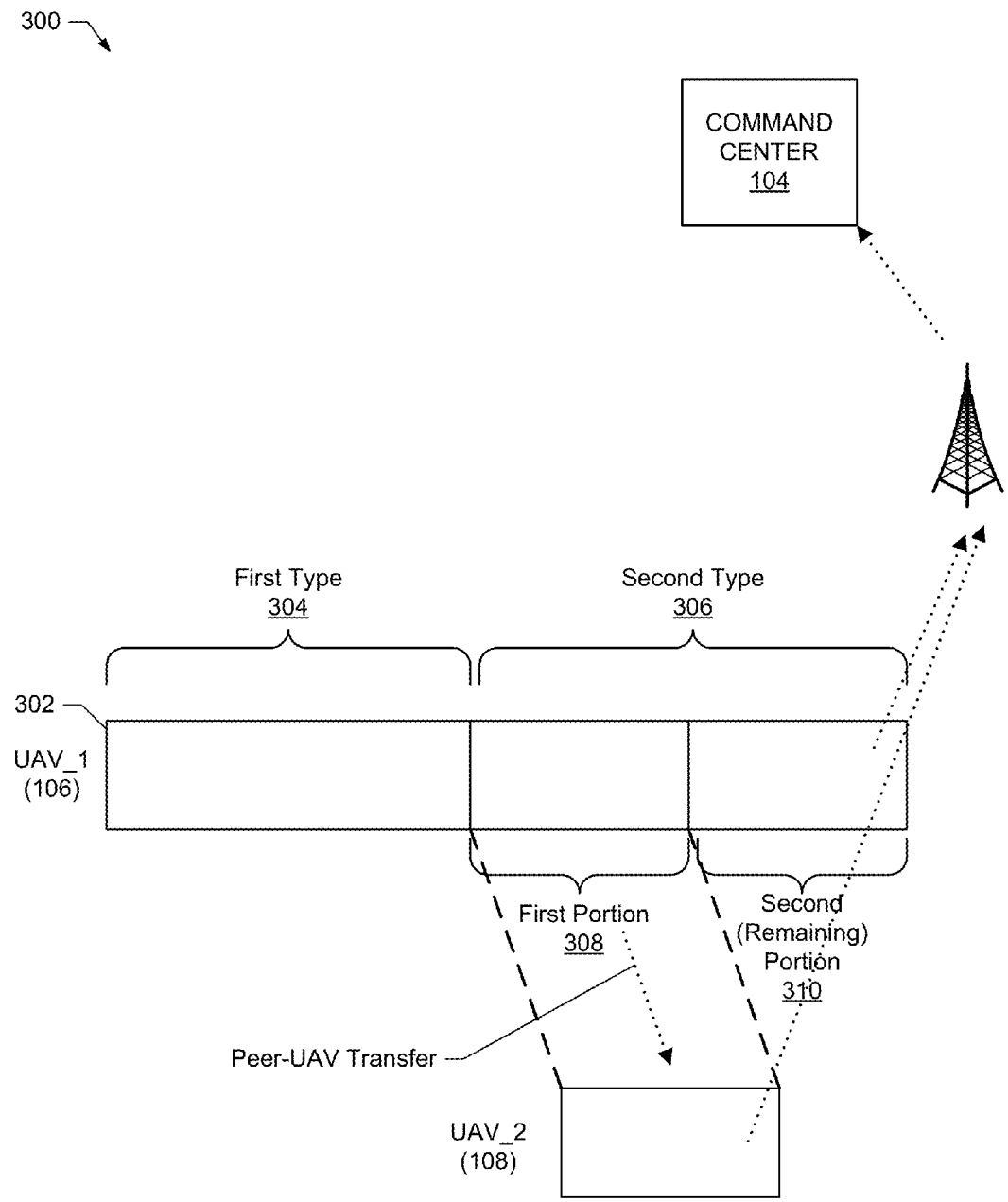
FIG. 3 is an example payload division map illustrating an example manner of payload data partitioning by the example payload manager of FIGS. 1 and 2.

FIG. 3 illustrates an example payload division map 300. In the illustrated example of FIG. 3, the payload division map 300 includes payload data 302 associated with the first UAV 106. The example payload data 302 includes a first type of data 304 and a second type of data 306. For the sake of example, assume that the first type of data 304 is associated with a relatively lower resolution as compared with the second type of data 306. In some examples, relatively lower resolution data is retained on the UAV for the duration of the mission, while relatively higher resolution data is partitioned for peer-UAV transfers in an effort to improve transmission speed and efficiency to the command center 104. The example UAV data transfer engine 216 determines how to partition the second type of data 306. In the illustrated example of FIG. 3, there is only one peer-UAV (the second UAV 108) that can receive and/or otherwise obtain one or more partitions of the second type of data 306. As such, the example UAV data transfer engine 216 divides the second type of data 306 in half, for which a first portion 308 is transmitted to the second UAV 108 (e.g., via the ad-hoc network) while a second portion (remaining portion) 310 is retained on the first UAV 106.

Upon completion of transferring the first portion of data 308 to the second UAV 108, the second UAV transmits the first portion of data 308 to the command center 104, such as by way of a cell-based network having a greater communication range than the inter-UAV ad-hoc network. Additionally, upon completion of transferring the first portion of data 308 to the second UAV 108, the first UAV transmits the remaining portion 310 to the command center 104, such as by way of the cell-based network. After the first portion of data 308 is transferred to the second UAV 108, the first portion of data 308 may be deleted from UAV storage, thereby allocating additional storage space for further mission data acquisition. Additionally, after the second portion of data 310 is transferred to the command center 104, the second portion of data 310 may be deleted from UAV storage, thereby allocating additional storage space for further mission data acquisition. While the illustrated example of FIG. 3 includes two UAVs, for which the second type of data 306 was divided in half, examples disclosed herein are not limited thereto. For example, in the event three UAVs were available in the ad-hoc network, then the example UAV data transfer engine 216 may divide the second type of data 306 into thirds.

In some examples, peer-UAV payload data transfers occur by way of an 802.11x protocol that has bandwidth and power consumption advantages over alternative communication protocols, such as LTE. As such, the example peer-UAV transfers of portions of payload data allows each recipient UAV to further transfer their respective portions to the command center 104 faster than would otherwise occur if only a single UAV was responsible for the complete data payload. Further, because each respective peer-UAV is only transmitting their portion of the payload data using the LTE protocol, the respective power consumed by the LTE radio(s) is reduced due to the smaller portion of payload data it is responsible for.

After a successful transfer of a portion of payload data from the first UAV 106 to the second UAV 108, the example payload data storage interface 108 deletes the transferred portion of payload data from on-board storage (e.g., the example payload data storage 130). As a result, the first UAV 106 has relinquished an amount of storage space that can otherwise be consumed by additional mission data acquisition activities. Additionally, in the event the first UAV 106 is lost or stolen, the deleted portion of payload data is no longer a security risk. The remaining portion(s) of payload data that were not transferred to a peer-UAV are either maintained in on-board memory or, as described above, transferred back to the command center 104, if possible. For example, if the first UAV 106 has communication capabilities with the command center 104 (e.g., radio-based communication capabilities that are in-range, LTE communication capabilities that are in-range, etc.), then the remaining portion(s) of payload data not previously transferred to the peer-UAVs is transferred back to the command center 104.

In some examples, attempts to transfer payload data from the UAV to one or more peer-UAVs is not successful. The example UAV data transfer engine 216 determines whether a threshold transmission duration has been satisfied and, if not, further transfer attempts are attempted. However, when the example UAV data transfer engine 216 determines that the threshold transmission duration has been exceeded, then the example payload data storage interface 208 determines whether to delete the payload data in the interest of security. If the payload data is not to be deleted, such as in circumstances where the payload data is not deemed particularly sensitive or secret, then the payload data is maintained in the example payload data storage 130. The example flight system interface 204 then issues a command to return the UAV to the command center 104, or to perform a safe landing. On the other hand, in the event the example payload data storage interface 208 determines that the payload data is to be deleted, then it deletes the payload data from the example payload data storage 130 to prevent disclosure to third parties in the event the UAV does not successfully return to the command center 104.

In some examples, the example flight system interface 204 determines whether an indication of UAV failure has occurred. For example, if the example flight system interface 204 detects a component failure and/or intermittent functionality, then a concern for safe retrieval of the UAV may exist. In response to detecting the failure indication, the example payload data storage interface 208 determines whether the payload data is to be deleted in the interest of data security. If so, then the example payload data storage interface 208 deletes the payload data. As such, if the detected failure ultimately results in a crash, then third party theft of the UAV will not result in disclosure of the payload data.

During mission operation, a deployment profile manages decisions regarding: whether to enable peer-UAV payload data transfers, whether to transfer remaining payload data to the command center or retain in on-board memory, whether to change a communication protocol, and/or whether to delete payload data in view of one or more triggers. In the illustrated example of FIG. 4, a deployment profile 400 includes a deployment parameter column 402 and a parameter value column 404. One or more parameters and corresponding parameter values of the example deployment profile 400 may be evaluated by the example payload manager 128 when making decisions during deployed missions. Parameters disclosed below include non-limiting examples, such as a video resolution of 640×480 to be used when the UAV is initially deployed (306), or a video resolution of 1920×1080 to be used when the UAV reaches the geographic ROI (408). While the above examples identify a particular pixel resolution parameter value, some examples identify a particular codec to be used (e.g., MP4, MKV, M4V, H.264, MPEG-2, etc.). In some examples, the deployment profile 400 specifies that LTE is the communication protocol to be used between the UAV and the command center 104 at the geographic ROI (410). In other examples, the deployment profile 400 specifies that the 802.11x protocol between peer-UAVs is to be used at the geographic ROI (312), while an LTE communication protocol between peer-UAVs is to be used when a threat is detected (414). In still other examples, the deployment profile 400 specifies that all payload data is to be deleted from the UAV in the event of a crash indication (416). In some examples, the deployment profile 400 specifies options/actions to be taken after a peer-UAV transfer has been completed (418). Example options/actions to be taken include (a) deleting all transferred data from on-board storage and transferring the remaining payload data to the command center, (b) deleting all transferred data from on-board storage and retaining the remaining payload data in on-board storage, or (c) maintaining all payload data in on-board storage.

While an example manner of implementing the payload manager 128 of FIGS. 1 and 2 is illustrated in FIGS. 1-4, one or more of the elements, processes and/or devices illustrated in FIGS. 1 and 2 may be combined, divided, re-arranged, omitted, eliminated and/or implemented in any other way. Further, the example UAV controller 120, the example flight system 122, the example payload equipment 124, the example communication equipment 126, the example payload data storage 130, the example communication equipment interface 202, the example flight system interface 204, the example payload equipment interface 206, the example payload data storage interface 208, the example UAV discovery engine 210, the example payload data type identifier 212, the example encryption engine 214, the example UAV data transfer engine 216 and/or, more generally, the example payload manager 128 of FIGS. 1 and 2 may be implemented by hardware, software, firmware and/or any combination of hardware, software and/or firmware. Thus, for example, any of the example UAV controller 120, the example flight system 122, the example payload equipment 124, the example communication equipment 126, the example payload data storage 130, the example communication equipment interface 202, the example flight system interface 204, the example payload equipment interface 206, the example payload data storage interface 208, the example UAV discovery engine 210, the example payload data type identifier 212, the example encryption engine 214, the example UAV data transfer engine 216 and/or, more generally, the example payload manager 128 of FIGS. 1 and 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example UAV controller 120, the example flight system 122, the example payload equipment 124, the example communication equipment 126, the example payload data storage 130, the example communication equipment interface 202, the example flight system interface 204, the example payload equipment interface 206, the example payload data storage interface 208, the example UAV discovery engine 210, the example payload data type identifier 212, the example encryption engine 214, the example UAV data transfer engine 216 and/or, more generally, the example payload manager 128 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example payload manager 128 of FIGS. 1 and 2 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the payload manager 128 of FIGS. 1 and 2 are shown in FIGS. 5A-5D and 6A-6D. In these examples, the machine readable instructions comprise a program for execution by a processor such as the processor 712 shown in the example processor platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program(s) and/or parts thereof could alternatively be executed by a device other than the processor 712 and/or embodied in firmware or dedicated hardware. Further, although the example program(s) is described with reference to the flowcharts illustrated in FIGS. 5A-5D and 6A-6D, many other methods of implementing the example payload manager 128 may alternatively be used. For example, the order of execution of the blocks may be changed, and/or some of the blocks described may be changed, eliminated, or combined.

As mentioned above, the example processes of FIGS. 5A-5D and 6A-6D may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5A-5D and 6A-6D may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5A:
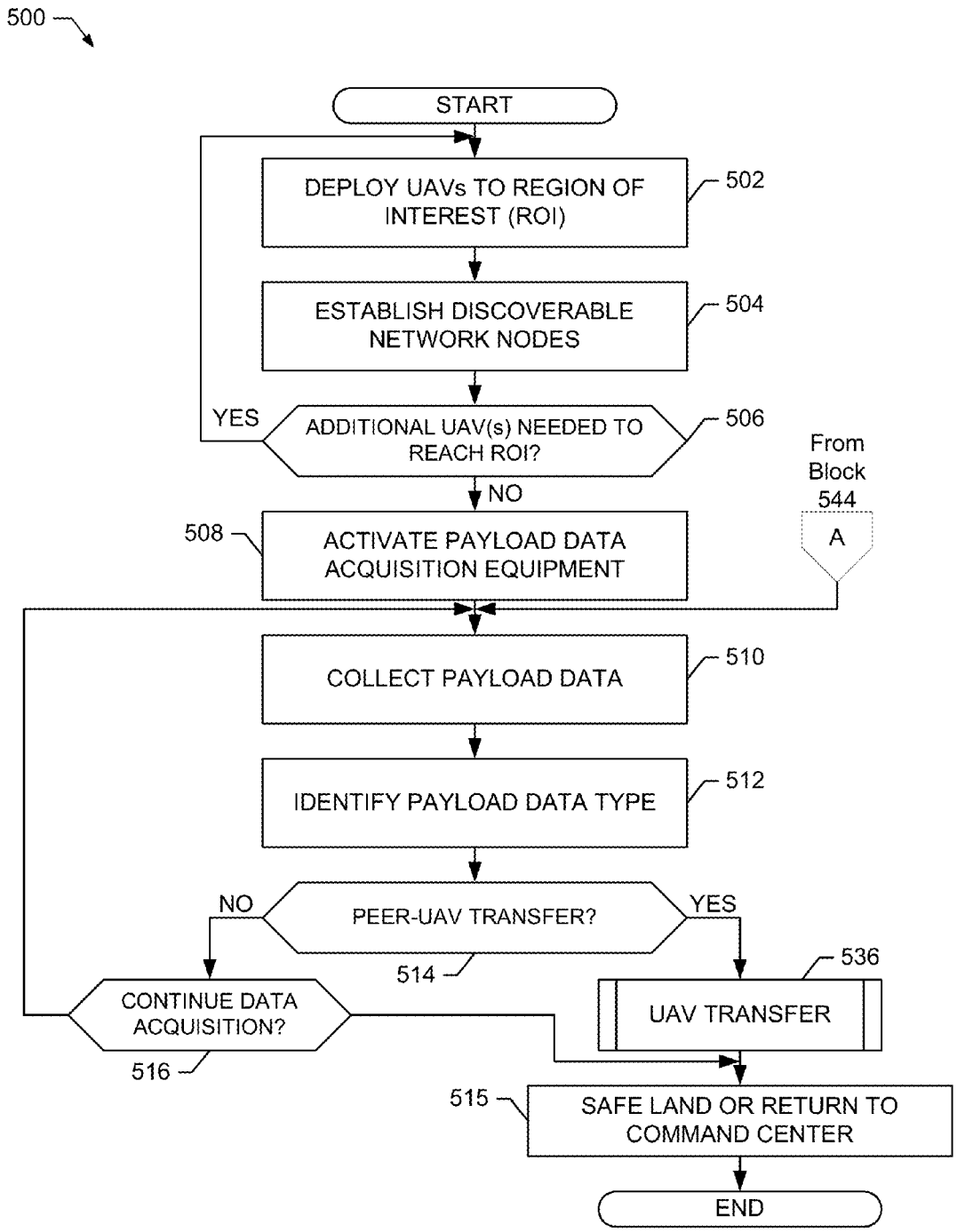
FIGS. 5A, 5B, 5C and 5D are flowcharts representative of example machine readable instructions that may be executed to implement the example UAV mission environment of FIG. 1.
Figure 5B:
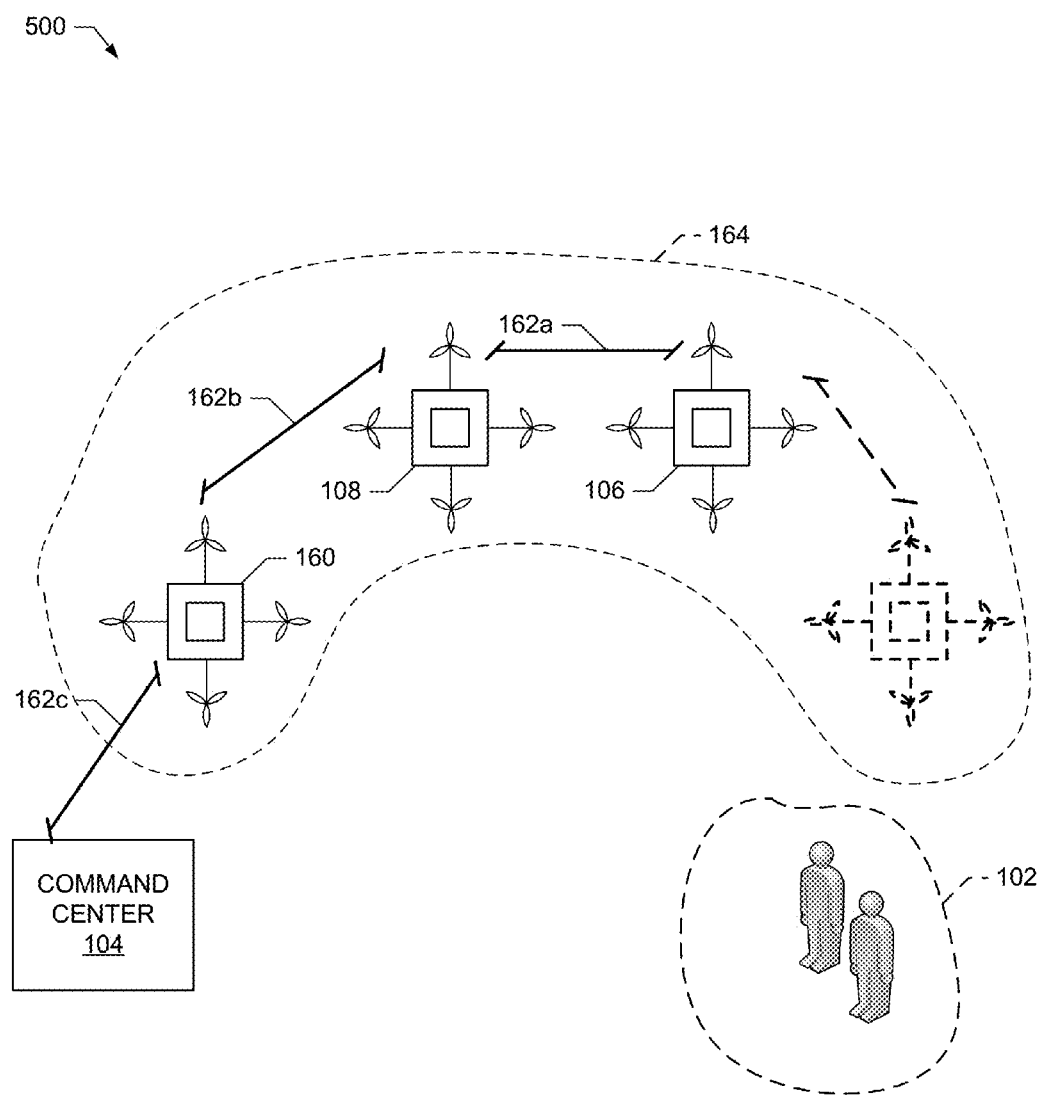

The program 500 of FIG. 5A begins at block 502, where the example command center 104 deploys two or more UAVs to a geographic ROI 102, such as a potential emergency crash site. Examples disclosed below in connection with FIGS. 5A, 5B, 5C and 5D illustrate a system-wide view of the example UAV mission environment 100. The example UAV discovery engine 210 establishes the two or more UAVs upon dispatch with discoverable network nodes (block 504), and the example command center 104 determines whether one or more additional UAVs are needed to reach the geographic ROI 102 (block 506). For example, while the command center 104 may initially dispatch three (3) UAVs on a mission to the geographic ROI 102, those three (3) UAVs may not be able to reach the geographic ROI 102 while still maintaining an ability to communicate with each other via a desired communication protocol (e.g., Wi-Fi (802.11x)). As shown in FIG. 5B, the example command center 104 has deployed the first UAV 106, the second UAV 108, and a third UAV 160 on a mission toward the geographic ROI 102. Each of the deployed UAVs has an inherent communication distance threshold for which it is able to maintain communication with an adjacent UAV. For example, the first UAV 106 is able to communicate with the adjacent second UAV 108 as long as the distance therebetween does not exceed a communication distance threshold 162A. Similarly, the second UAV 108 is able to communicate with the adjacent third UAV 160 as long as the distance therebetween does not exceed a communication distance threshold 162B, and the third UAV 160 is able to communicate with the command center 104 as long as the distance therebetween does not exceed a communication distance threshold 162C. As such, when the example communication equipment interface 202 determines that the distance between one or more UAVs is approaching a particular communication distance threshold, then the example command center 104 may dispatch another UAV so that a chain of UAVs 164 is established that (a) reaches the geographic ROI 102 and (b) allows adjacent UAVs to communicate with each other (block 104).

In the illustrated example of FIG. 5B, the first deployed UAV is the first UAV 106 that has not yet reached the geographic ROI 102. In the event each of the three previously deployed UAVs were to continue advancing to the geographic ROI 102, then corresponding communication distance thresholds may be exceeded, thereby preventing peer-UAV communication capabilities therebetween. In some examples, peer-UAV communication capabilities may be sacrificed when a sufficient number of UAVs are not available to establish the chain of UAVs 164, in which case each UAV may employ one or more alternative communication protocols (e.g., cell-based LTE, etc.) to maintain communication with the command center 104. However, in the event the command center 104 includes one or more additional UAVs capable of being deployed, such as a fourth UAV in the illustrated example of FIG. 5B, then the chain of UAVs 164 may grow to include a sufficient number to (a) reach the geographic ROI 102 and (b) maintain peer-UAV communication with adjacent UAVs.

Returning to FIG. 5A, the example payload equipment interface 206 activates payload data acquisition equipment on one or more UAVs of the mission (block 508). For example, while each of the first UAV 106 and the second UAV 108 may include sensors, the example payload equipment interface 206 may only activate those sensors and/or other data acquisition equipment on the particular UAV that is nearest the geographic ROI 102. The example payload equipment interface 206 enables the data acquisition activities of one or more sensors/equipment to facilitate collection of payload data (block 510). As described above, collected payload data may be managed in different ways depending on the characteristics of the collected data and/or situational conditions. For example, the example payload data type identifier 212 identifies a payload data type (block 512) and in the event the example deployment profile 400 indicates and/or otherwise authorizes peer-UAV communication when data is acquired at a high resolution (e.g., see item 412 of FIG. 4), then the example UAV data transfer engine determines whether a peer-UAV transfer is to occur, or whether acquired data is to remain in on-board storage (block 514). If payload data is to remain in on-board storage, the example flight system interface 204 determines whether to continue data acquisition efforts (e.g., the mission is still ongoing) (block 516) and control returns to block 510.

Figure 5C:
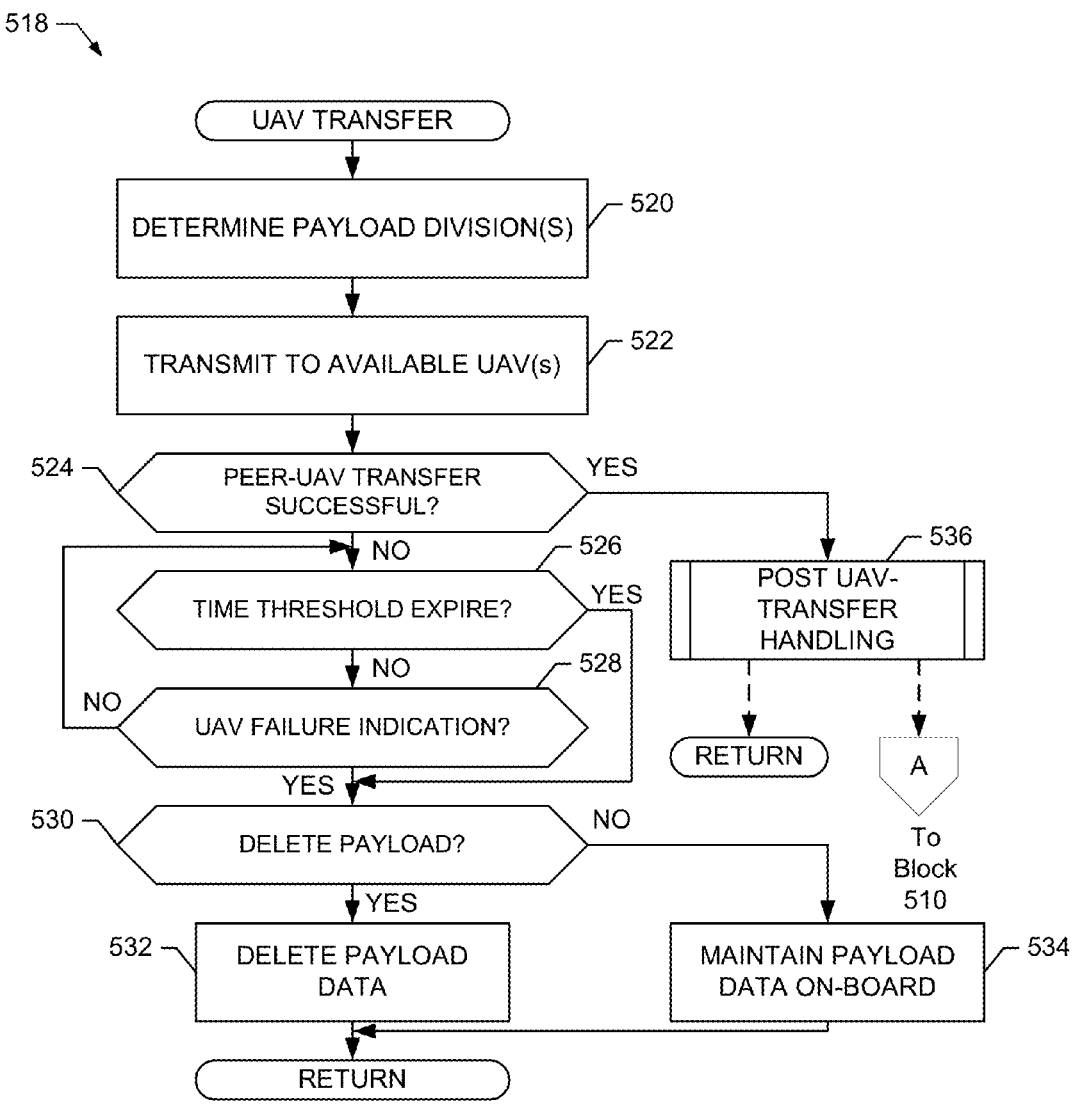

In the event one or more peer-UAV transfers is to occur (block 514), then the example UAV data transfer engine 216 manages the one or more peer-UAV transfers (block 518). FIG. 5C illustrates additional detail in connection with the peer-UAV transfers of block 518. In the illustrated example of FIG. 5C, the example UAV data transfer engine 216 determines a payload division (block 520). As described above in connection with FIG. 3, the example UAV data transfer engine 216 generates an example payload division map 300 and determines how many times to divide the payload data based on, for example, a number of candidate peer-UAVs within communication range. For example, if one other peer-UAV is within communication range, then the example UAV data transfer engine 216 divides the payload data in half so that each UAV may independently transfer its share of payload data to the command center 104 (e.g., via a relatively longer-range communication protocol, such as a cell-based LTE). The example UAV data transfer engine 216 transfers the data to the one or more available peer-UAVs (block 522) and determines whether the transfer attempt was successful (block 524).

In the event that the UAV data transfer engine 216 determines that the peer-UAV transfer was not successful (block 524), then the example UAV data transfer engine 216 determines whether a time threshold has expired (block 526), such as an amount of time to allow the data to be transferred and/or an amount of time to permit one or more data transmission reattempts. If the time threshold has not expired (block 526), the example flight system interface 204 also determines whether a UAV failure indication has been retrieved and/or otherwise received (block 528). If no UAV failure indication has been determined (block 528), then control returns to block 526 to determine whether the timeout (e.g., satisfaction of a time threshold) has occurred.

If either a timeout has occurred (block 526) or an indication of UAV failure has been determined (block 528), then the example payload data storage interface 208 determines whether to delete the payload data (block 530). As described above, UAVs may operate in hostile territories in which the payload data collected thereon may be deemed sensitive, secret and/or otherwise not appropriate for disclosure to one or more third parties. As described above in connection with the example deployment profile 400 of FIG. 4, if the example crash indication directive is set to delete all payload data (see item 416), then the example payload data storage interface 208 determines that the payload should be deleted (block 530) and proceeds to delete the payload data (block 532). On the other hand, if the example crash indication directive is set to maintain payload data in on-board storage, then the example payload data storage interface 208 determines that the payload should not be deleted (block 530), and maintains the payload data in on-board storage (block 534). The example flight system interface 204 then instructs the UAV to return to the example command center 104 or attempt a safe landing (block 515 of FIG. 5A).

Figure 5D:
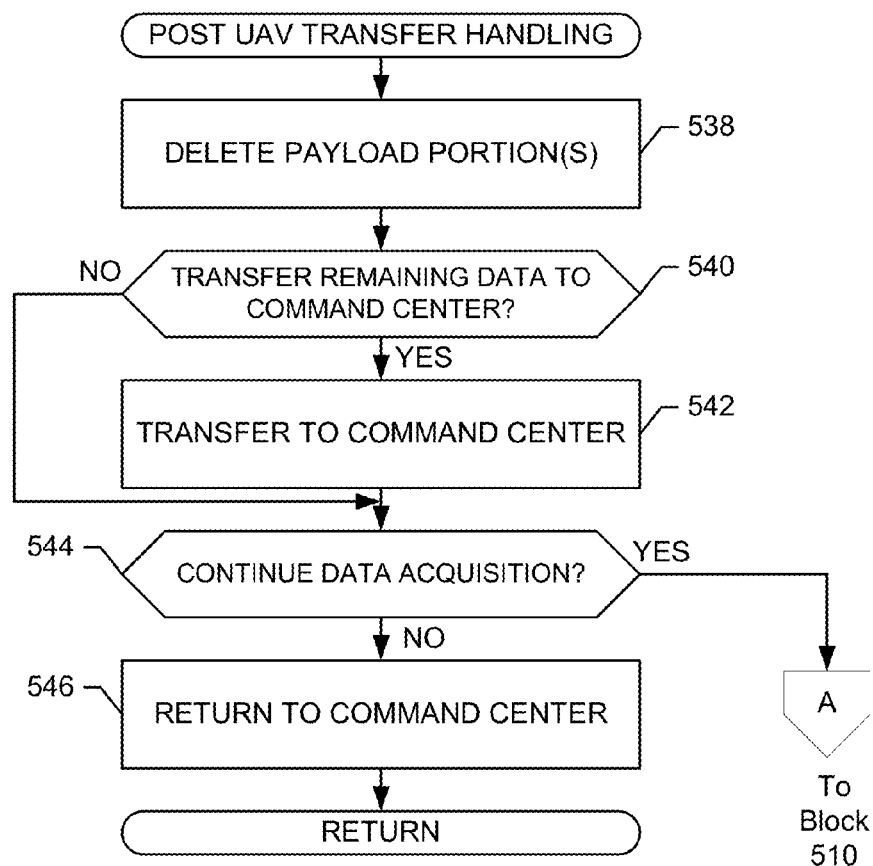

Returning to block 524, in the event the example peer-UAV transfer was successful, then the example payload data storage interface 208 performs post-UAV transfer handling (block 536). FIG. 5D illustrates additional detail in connection with the post-UAV transfer of block 536. In the illustrated example of FIG. 5D, the example payload data storage interface 208 deletes portion(s) of the payload that have been successfully transferred to one or more peer-UAVs (block 538). In effect, deleting the payload data that has successfully been transferred to one or more peer-UAVs allows the UAV a relatively greater amount of available on-board storage/memory space for further data acquisition during the mission. The example UAV data transfer engine 216 determines whether the remaining payload data is to be transferred to the command center 104 or is to remain in on-board storage (block 540). As described above in connection with the example deployment profile 400 of FIG. 4, a post-UAV transfer parameter (see item 418) may instruct one or more different actions after the successful transfer. In some examples, the deployment profile 400 instructs the UAV data transfer engine 216 (block 540) to delete all previously transferred payload data and then transfer all remaining payload data to the command center (block 542). In some examples, the deployment profile 400 instructs the UAV data transfer engine 216 (block 540) to delete all previously transferred payload data and then retain remaining payload data in on-board storage, and in still other examples, the deployment profile 400 instructs the UAV data transfer engine 216 to maintain all payload data (whether transferred to a peer-UAV or not) in on-board storage. If the example flight system interface 204 determines that the mission is not complete and additional data acquisition is to occur (block 544), control returns to block 510 of FIG. 5A, otherwise the UAV is instructed to return to the example command center 104 (block 546).

While the illustrated example of FIGS. 5A, 5B, 5C and 5D disclose a system-wide view of the example UAV mission environment 100, example FIGS. 6A, 6B, 6C and 6D disclose examples from the point of view of a single UAV operating in the UAV mission environment 100. In the illustrated example of FIG. 6A, the flight system interface 204 determines whether the UAV has been deployed (block 602). If not, then the example flight system interface 204 continues to monitor or retrieve one or more signals indicative of deployment from the example flight system 122 and/or communication equipment 126 (block 602). When the example flight system interface 204 retrieves and/or otherwise receives an indication that deployment has occurred (block 602), then the example flight system interface 204 retrieves and/or otherwise receives deployment instructions (profile) (block 604), such as the example deployment profile 400 disclosed above in connection with FIG. 4. Notwithstanding the example deployment profile 400 disclosed above in connection with FIG. 4, the instructions/profile may include information related to the geographic ROI 102 (e.g., GPS coordinates), profile type instructions, and/or peer communication protocol instructions (e.g., conditions with which to use a particular communication protocol).

The example communication equipment interface 202 establishes a discoverable network node for candidate peer-UAVs that may be in communication range (block 606). If the UAV has not yet arrived at the geographic ROI 102, as determined by the example flight system interface 204 (block 608), the example UAV discovery engine 210 determines whether one or more peer-UAVs has made a request to join a cloud network (block 610). If so, then the example UAV discovery engine 210 establishes communication with the requesting UAV to participate in the cloud network of two or more UAVs (block 612). When the example flight system interface 204 determines that the UAV (e.g., the first UAV deployed and closest to the geographic ROI) has arrived at the example geographic ROI 102 (block 608), then the example payload equipment interface 206 activates one or more sensors or other data acquisition equipment carried by the UAV (block 614) and the example payload data storage interface 208 begins acquisition of payload data (block 616). However, in some examples, the payload equipment interface 206 activates the data acquisition equipment carried by the UAV as soon as it is deployed. For example, a video camera carried by the UAV may be activated as soon as the UAV is deployed to capture video information en-route to the example geographic ROI 102. In some examples, the video camera acquires video information at one resolution (e.g., a relatively low resolution (640×480)) en-route to the geographic ROI 102, and then acquires video information at a second resolution (e.g., a relatively higher resolution (1920×1080) upon arriving at the geographic ROI 102. Additional detail associated with payload data management (block 618) is shown below in connection with FIG. 6B. The example payload data management of block 618 includes, but is not limited to determining on-board storage limit thresholds, monitoring time thresholds since data transfer, foreign UAV detection instructions, dynamic deployment profile changes (e.g., profile changes updated by the example control center 104), and/or crash indication instructions.

Figure 6A:
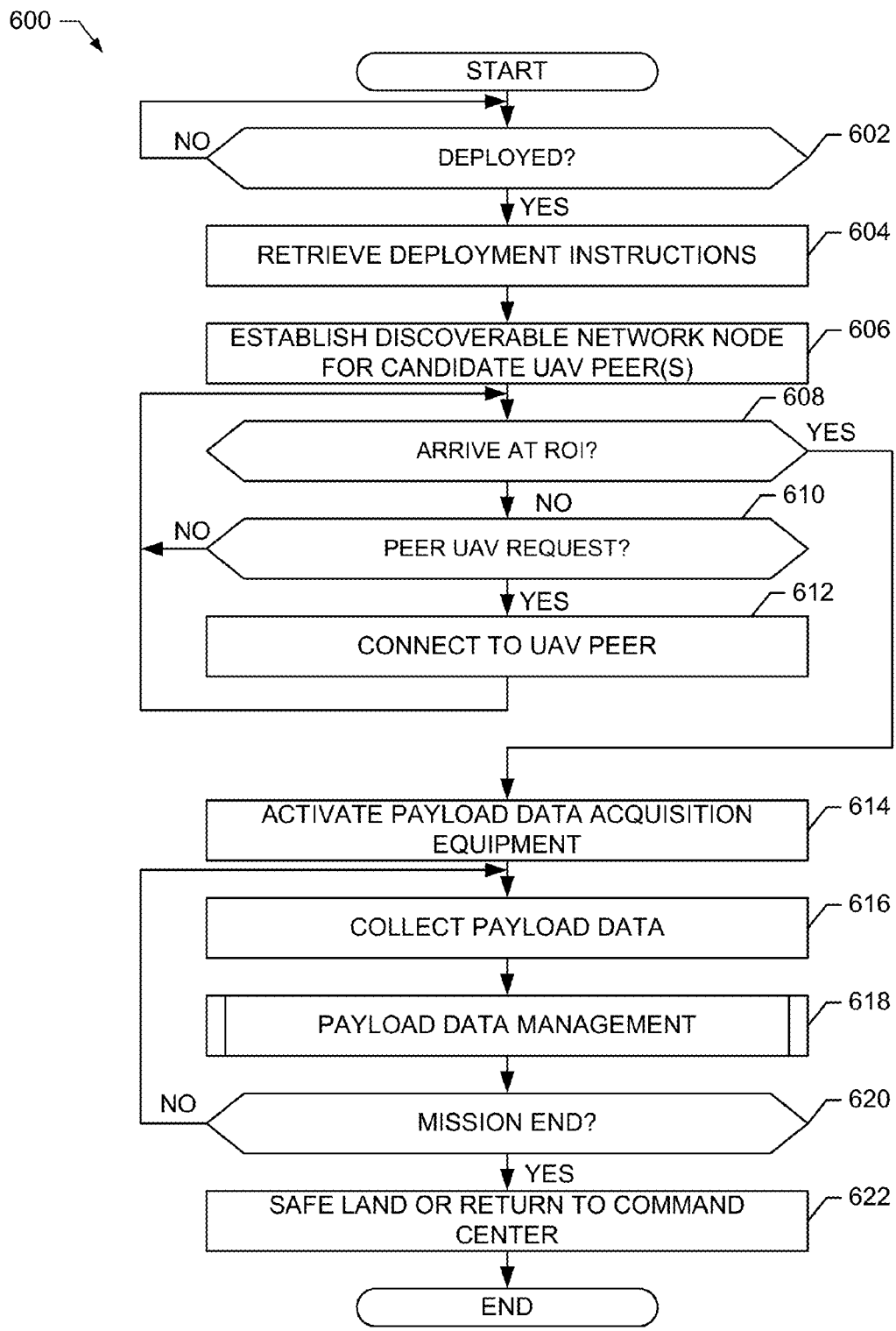
FIGS. 6A, 6B, 6C and 6D are flowcharts representative of example machine readable instructions that may be executed to implement the example payload manager 128 of FIGS. 1 and/or 2 to network UAVs.
Figure 6B:
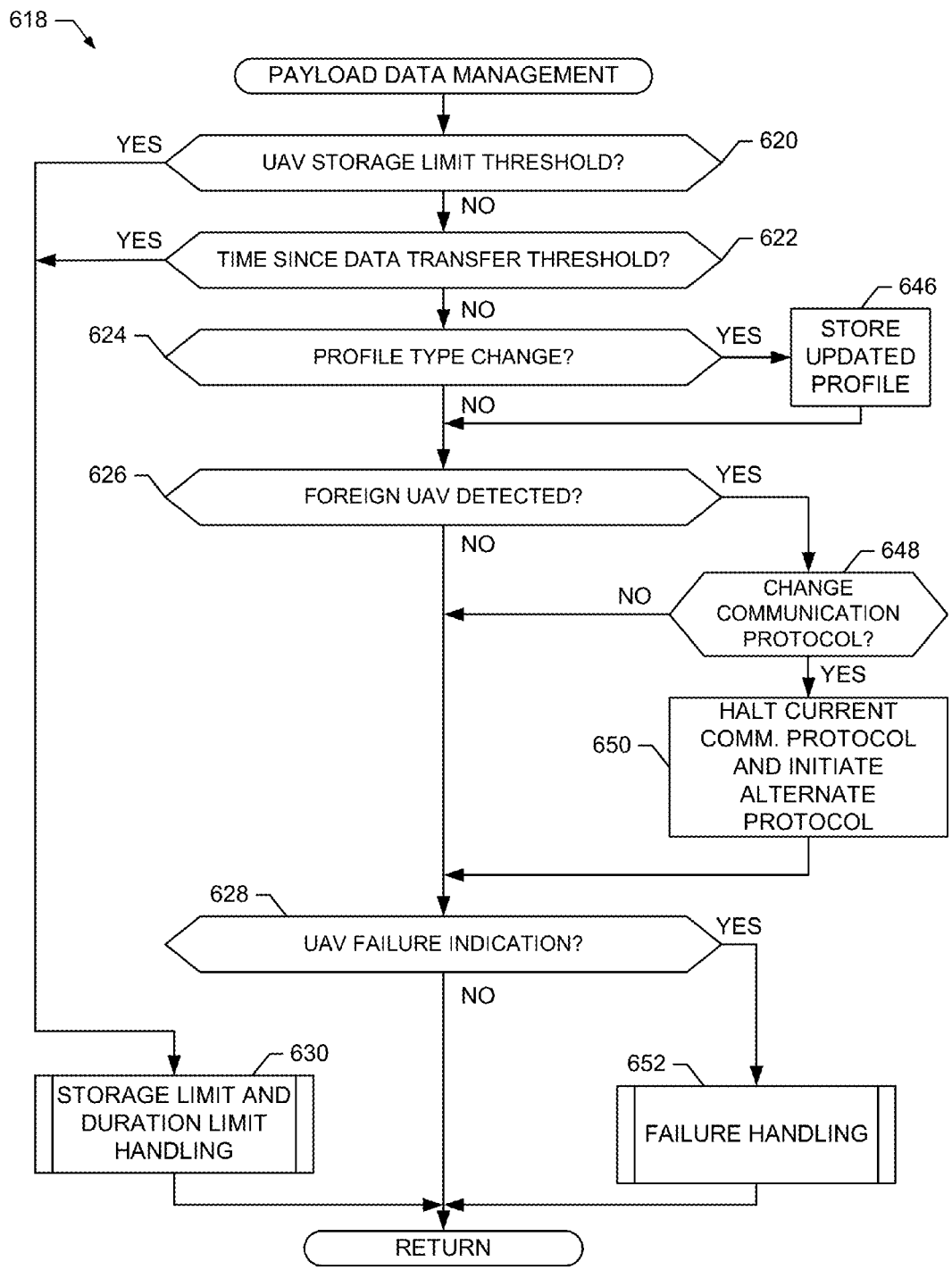

In the illustrated example of FIG. 6B, the example payload manager 128 determines: whether the UAV storage limit threshold has been satisfied (e.g., exceeded) (block 620); whether a time since last data transfer occurred threshold has been satisfied (e.g., exceeded) (block 622); whether a profile type change has occurred (block 624); whether a foreign UAV has been detected (block 626); and whether a UAV failure indication has been detected (block 628). The example payload data storage interface 208 monitors a storage capacity value of on-board storage (e.g., the example payload data storage 130) to determine if a threshold value has been satisfied (e.g., 75% of the available storage space of the example payload data storage 130 is consumed) (block 620), and also determines whether a threshold of the time since a last transfer occurrence has been satisfied (block 622). If either case is true, then the example UAV data transfer engine 216 facilitates storage limit and duration limit handling (block 630), as discussed in further detail in connection with FIG. 6C.

Figure 6C:
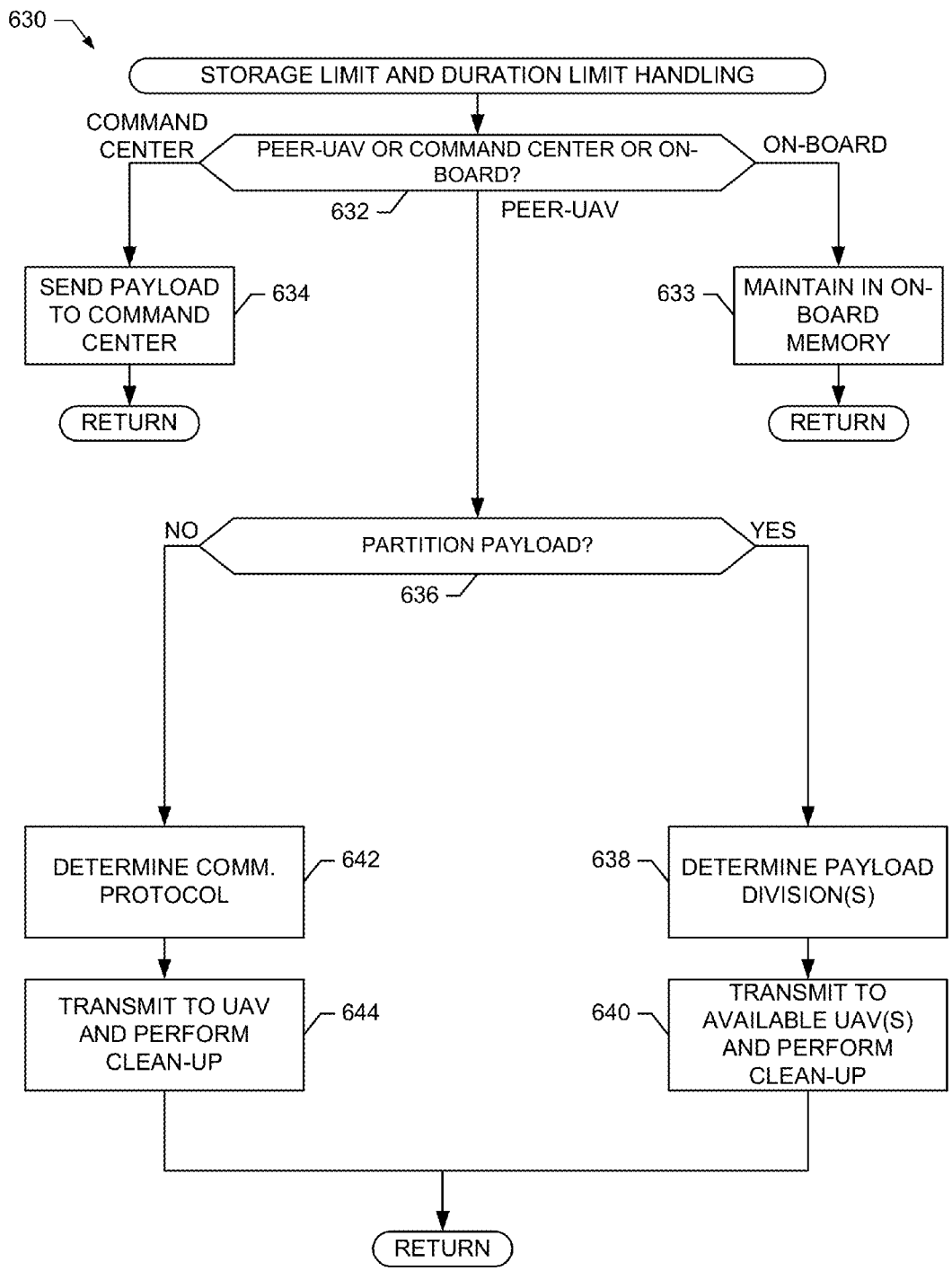

In the illustrated example of FIG. 6C, the example UAV data transfer engine 216 determines whether data is to be transferred to the example command center 104 (e.g., via cell-based LTE), whether data is to be transferred to a peer-UAV, or whether data is to be maintained on-board (block 632). In some examples, the UAV data transfer engine 216 refers to the example deployment profile 400 of FIG. 4 to determine a manner of handling the payload data. In the event one or more of the deployment parameters indicate that payload data is to be maintained on-board (block 632), then the example payload data storage interface 208 leaves the acquired payload data in on-board memory (e.g., in the example payload data storage 130) (block 633). In the event one or more deployment parameters (e.g., example deployment parameters 402 of FIG. 4) indicate that the payload data is to be sent to the command center 104 (block 632), then the example communication equipment interface 202 sends the payload to the example command center 104 and performs data cleanup (block 634). Data cleanup may include deleting the on-board profile data (or portions thereof) after an indication of successful transmission has occurred. Control then returns to block 618 of FIG. 6B.

In the event one or more deployment parameters indicate that the payload data is to be sent to a peer-UAV (block 632), then the example UAV data transfer engine 216 determines whether the payload data should be partitioned (block 636). In some examples, the deployment profile 400 includes default settings/instructions regarding peer-UAV payload partitioning in an effort to reduce a bandwidth and/or power requirements of the UAV. For example, while the UAV may be equipped with an LTE radio, such communication technologies consume relatively greater amounts of limited battery power of the UAV during transmission. However, by off-loading one or more portions of the payload data to one or more peer-UAVs, the amount of power consumed by the UAV when sending the payload data to the command center is reduced because a relatively smaller amount of payload data is sent using the LTE radio(s). In other words, a communication power budget for the networked UAVs is distributed more efficiently among the participating UAVs in the network. The example UAV data transfer engine 216 determines how the payload data is to be divided (block 638), and the partitions are transmitted to one or more peer-UAVs (block 640). However, if the example UAV data transfer engine 216 determines that the payload data is not to be partitioned (block 636), then the example communication equipment interface 202 identifies a desired communication protocol with which to transmit the payload data (e.g., cell-based LTE, satellite, etc.) (block 642). The example UAV data transfer engine 216 then sends the payload data to the peer UAV and performs any desired cleanup thereafter (e.g., deleting payload data from memory in response to an indication of transfer success) (block 644).

Returning to the illustrated example of FIG. 6B, the example flight system interface 204 determines whether a profile type change has occurred (block 624). For example, one or more parameters of the deployment profile 400 may be changed, added or removed dynamically during a mission of UAVs. In some examples, the deployment profile 400 may alter a deployment parameter 402 to include a different parameter value 404, such as an alternate resolution with which to acquire video data with an on-board video camera. Updates to the example deployment profile 400 may be transmitted to each UAV within the network of UAVs via any communication technology, such as cell-based LTE. However, in circumstances where the cell-based LTE or satellite communication technologies are not successful, deployment profile updates may occur via peer-UAV information transfers. For instance, in the illustrated example of FIG. 5B, the command center 104 may transmit an updated deployment profile 400 to the third UAV 160, which may further propagate the updated deployment profile to the second UAV 108, which may further propagate the updated deployment profile to the first UAV 106, and so on. The example payload data storage interface 208 stores the updated deployment profile upon receipt (block 646).

The example UAV discovery engine 210 determines whether one or more foreign UAVs are detected (block 626). If so, then the example communication system interface 202 determines whether a communication protocol change is to occur (block 648). In some examples, the communication system interface 202 refers to the deployment profile for instructions and/or actions to be taken in response to the detection of a threat, such as the detection of one or more foreign UAVs that may be proximate to the geographic ROI 102. If the communication protocol is to be changed in response to detecting a threat (block 648), then the example communication system interface 202 halts a current communication technology of the UAV and initiates one or more alternate communication protocols in an effort to enhance security of the payload data (block 650).

Figure 6D:
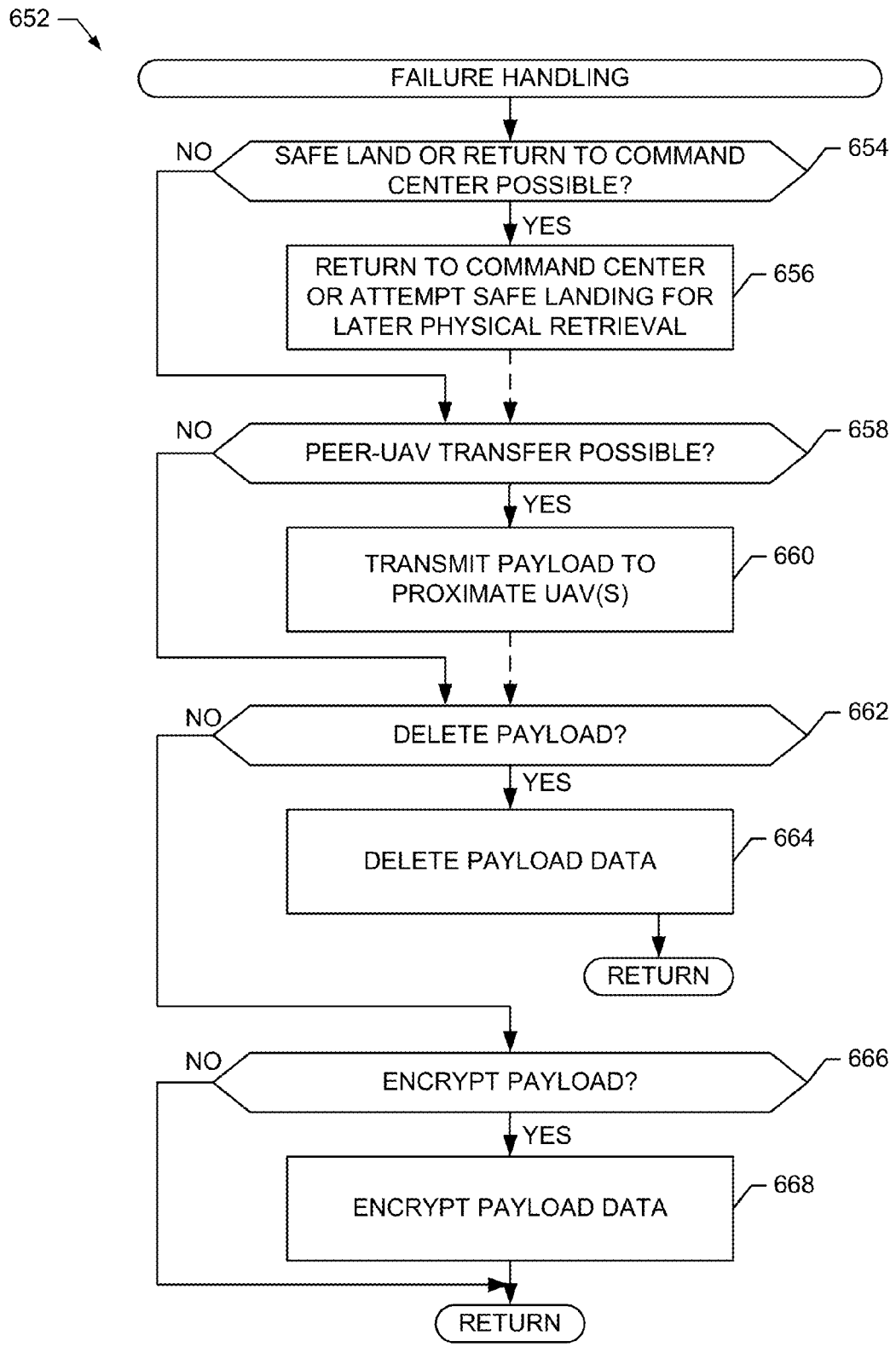

In the event the example flight system interface 204 detects an indication of a UAV failure (block 628), such as a motor failure indication, an electromechanical failure indication, particularly harsh weather conditions, etc., then failure handling is initiated (block 652), as described in further detail in FIG. 6D. In the illustrated example of FIG. 6D, the example flight system interface 204 determines whether to attempt a safe landing or return to the command center (block 654). In other words, some responses to a threat indication result in ending the mission and/or taking efforts to preserve the integrity of the UAV by stopping any further flight activity. If the example deployment profile 400 indicates that the UAV is to either return to the example command center 104 or attempt a safe landing (block 654), then the example flight system interface 204 instructs the UAV to proceed to return to the control center 104 or attempt a safe landing (block 656).

In some examples, instead of or in addition to returning to the command center 104, the example UAV discovery engine 210 determines whether a peer-UAV data transfer is still possible, despite the UAV failure indication (block 658). If such communication is still possible, then the UAV data transfer engine 216 transmits the payload data to one or more peer-UAVs within communication range of the crippled UAV (block 660). In still other examples, if the peer-UAV communication transfer is not possible (block 658) or after a successful transmission of the payload data to one or more peer-UAVs (block 660), the example payload data storage interface 208 determines whether to delete the payload data from on-board storage (block 662). As described above, in the event the UAV ultimately lands or crashes, any data stored thereon may be at risk of discovery by third parties. To reduce such a risk, the example payload data storage interface 208 deletes any payload data stored on the UAV (block 664). Alternatively, the example encryption engine 214 determines whether to encrypt the payload data (block 666), which may be an instruction from the example deployment profile 400. If so, then the example encryption engine 214 encrypts the payload data (block 668) to reduce the possibility that a third party obtains the payload data in case the UAV crashes or lands safely.

Figure 7:
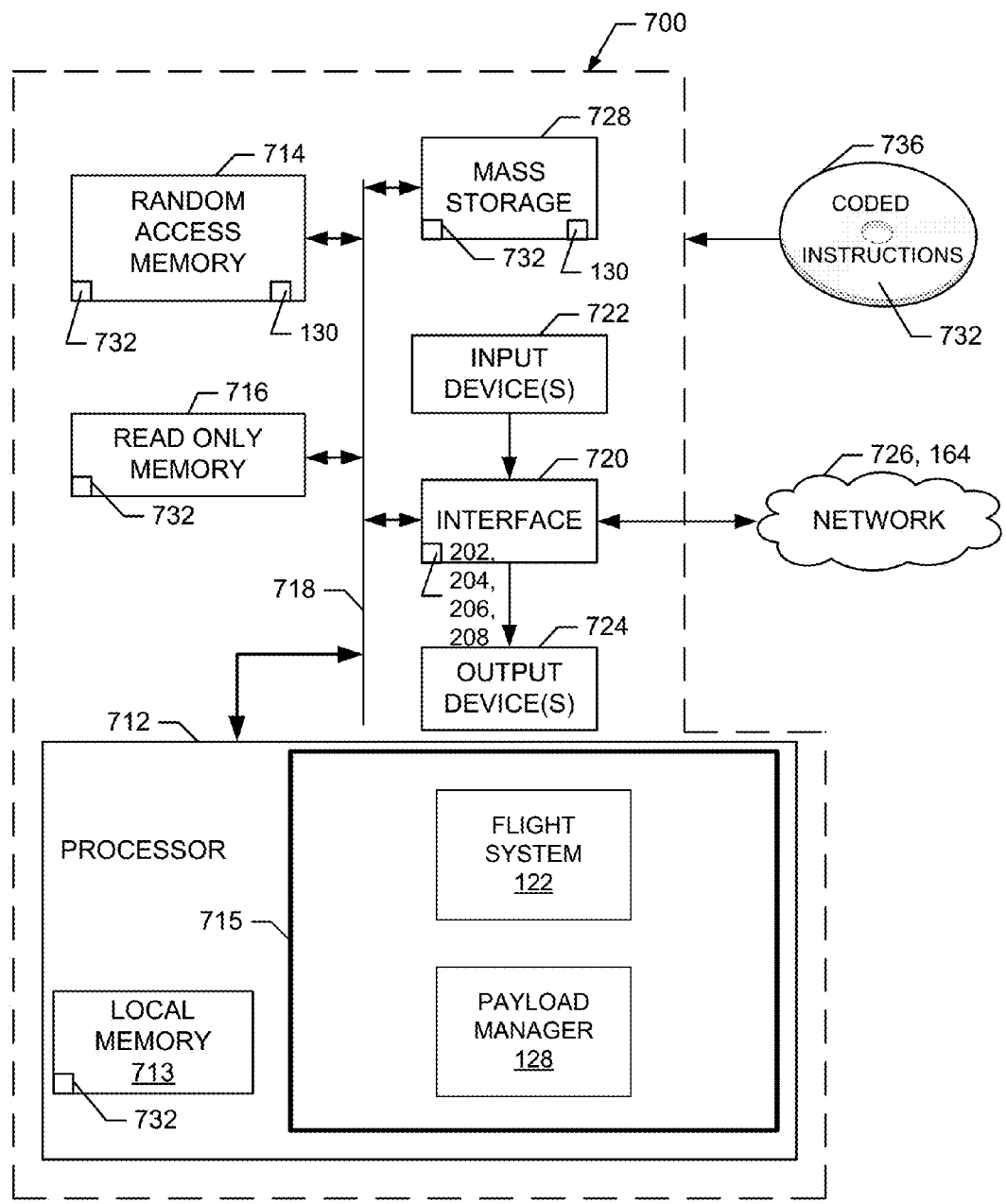
FIG. 7 is a block diagram of an example processor platform structured to execute the example machine readable instructions of FIGS. 5A-5D and 6A-6D to implement the example UAV environment and/or the example payload manager of FIGS. 1 and/or 2 to network UAVs.

FIG. 7 is a block diagram of an example processor platform 700 capable of executing the instructions of FIGS. 5A, 5B, 5C, 5D, 6A, 6B, 6C and/or 6D to implement the payload manager 128 of FIGS. 1 and 2. The processor platform 700 can be, for example, a server, a personal computer, a mobile device (e.g., a cell phone, a smart phone, a tablet such as an iPad™) an Internet appliance, a digital video recorder, a personal video recorder, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In the illustrated example of FIG. 7, the processor 712 includes one or more example processing cores 715 configured via example instructions 732, which include the example instructions of FIGS. 5A-5D and 6A-6D to implement the example UAV mission environment 100 and/or the example payload manager 128 of FIGS. 1 and 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 5A, 5B, 5C, 5D, 6A, 6B, 6C and/or 6D may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture facilitate improved networking of unmanned aerial vehicles that allows preservation and security of payload data under conditions that would otherwise jeopardize such payload data. Additionally, examples disclosed herein improve energy conservation (e.g., battery storage resources) of two or more networked UAVs by preventing any one of the networked UAVs from being the sole UAV designated for transmission of acquired payload data to one or more destinations. As disclosed herein, transmission of acquired payload data via a cell-based technology (e.g., LTE) may afford a desirable communication range, but at an expense of an energy drain while performing such transmissions. As such, examples disclosed herein distribute payload data transmission responsibilities to one or more other UAVs by first offloading one or more portions of the payload data using a more energy efficient communication technology (e.g., 802.xx) to proximate UAVs. Further, security of the payload data is improved by examples disclosed herein, such that perceived or actual threats by foreign UAVs in a vicinity of the geographic ROI may be addressed by dynamic communication protocol technology switching.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to establish a communication network for unmanned aerial vehicles, the method comprising:
    establishing, with a processor, a discoverable network node in a first unmanned aerial vehicle in response to deployment in a geographic region of interest;
    joining, with the processor, a second unmanned aerial vehicle to the communication network in response to a connection request;
    acquiring, with the processor, payload data with a sensor of the first unmanned aerial vehicle from the geographic region of interest;
    identifying, with the processor, a profile type of the payload data;
    dividing the payload data into a plurality of portions based at least on a number of unmanned aerial vehicles associated with the communication network when the profile type of the payload data has a first profile type; and
    transmitting, with the processor, a first portion of the payload data to the second unmanned aerial vehicle when the profile type of the payload data has the first profile type.

2. The method of claim 1, further including improving security of the payload data by deleting the first portion of the payload data from the first unmanned aerial vehicle after receiving an indication that the second unmanned aerial vehicle has received the first portion of the payload data.

3. The method of claim 1, further including transmitting at least one remaining portion of the payload data to a command center after the first portion of the payload data is transmitted to the second unmanned aerial vehicle.

4. The method of claim 3, further including deleting the at least one remaining portion of the payload data from the first unmanned aerial vehicle after transmitting the at least one remaining portion of the payload data to the command center is complete.

5. The method of claim 1, further including deleting one or more remaining portions of the payload data in response to a failure indication of the first unmanned aerial vehicle.

6. The method of claim 5, wherein the failure indication of the first unmanned aerial vehicle includes a crash indication.

7. The method of claim 1, further including preventing a security breach of one or more remaining portions of the payload data of the first unmanned aerial vehicle by deleting the remaining one or more portions of the payload data if transmission to a command center has not occurred after a threshold duration.

8. An apparatus to establish a communication network for unmanned aerial vehicles, the apparatus comprising:
    a discovery engine configured to:
        establish a discoverable network node in a first unmanned aerial vehicle in response to a deployment in a geographic region of interest; and
        join a second unmanned aerial vehicle to the communication network in response to a connection request;
    a payload equipment interface configured to acquire payload data with a sensor of the first unmanned aerial vehicle from the geographic region of interest;
    a payload data type identifier configured to identify a profile type of the payload data; and
    a data transfer engine configured to:
        divide the payload data into a plurality of portions based at least on a number of unmanned aerial vehicles associated with the communication network and the profile type; and
        transmit a first portion of the payload data to the second unmanned aerial vehicle when the profile type of the payload data has a first profile type.

9. The apparatus of claim 8, further including a data storage interface configured to delete the first portion of the payload data from the first unmanned aerial vehicle after receiving an indication that the second unmanned aerial vehicle has received the first portion of the payload data.

10. The apparatus of claim 8, further including a communication equipment interface configured to transmit at least one remaining portion of the payload data to a command center after the first portion of the payload data is transmitted to the second unmanned aerial vehicle.

11. The apparatus of claim 10, further including a data storage interface configured to delete the at least one remaining portion of the payload data from the first unmanned aerial vehicle after transmitting the at least one remaining portion of the payload data to the command center is complete.

12. The apparatus of claim 8, further including a data storage interface configured to delete one or more remaining portions of the payload data in response to a failure indication of the first unmanned aerial vehicle.

13. The apparatus of claim 12, wherein the failure indication of the first unmanned aerial vehicle includes a crash indication.

14. The apparatus of claim 8, wherein the data transfer engine is configured to transmit one or more remaining portions of the payload data to the second unmanned aerial vehicle in response to a flight error indication of the first unmanned aerial vehicle.

15. A tangible computer readable storage medium, including instructions that, when executed by a processor, cause the processor at least to perform operations comprising:
    establishing a discoverable network node in a first unmanned aerial vehicle in response to deployment in a geographic region of interest;
    joining a second unmanned aerial vehicle to a communication network in response to a connection request;
    acquiring payload data with a sensor of the first unmanned aerial vehicle from the geographic region of interest;
    identifying a profile type of the payload data;
    dividing the payload data into a plurality of portions based at least on a number of unmanned aerial vehicles associated with the communication network when the profile type of the payload data has a first profile type; and
    transmitting a first portion of the payload data to the second unmanned aerial vehicle when the profile type of the payload data has the first profile type.

16. The tangible computer readable storage medium of claim 15, wherein the operations further include improving security of the payload data by deleting the first portion of the payload data from the first unmanned aerial vehicle after receiving an indication that the second unmanned aerial vehicle has received the first portion of the payload data.

17. The tangible computer readable storage medium of claim 15, wherein the operations further include transmitting at least one remaining portion of the payload data to a command center after the first portion of the payload data is transmitted to the second unmanned aerial vehicle.

18. The tangible computer readable storage medium of claim 17, wherein the operations further include deleting one or more remaining portions of the payload data from the first unmanned aerial vehicle after transmitting the one or more remaining portions of the payload data to the command center is complete.

19. The tangible computer readable storage medium of claim 15, wherein the operations further include deleting one or more remaining portions of the payload data in response to a failure indication of the first unmanned aerial vehicle.

20. The tangible computer readable storage medium of claim 19, wherein the operations further include identifying the failure indication of the first unmanned aerial vehicle as including a crash indication.

21. The tangible computer readable storage medium of claim 15, wherein the operations further include preventing a security breach of one or more remaining portions of the payload data of the first unmanned aerial vehicle by deleting the one or more remaining portions of the payload data if transmission to a command center has not occurred after a threshold duration.

\* \* \* \* \*